United States Patent [19]

Fierkens et al.

[11] Patent Number: 5,306,401
[45] Date of Patent: Apr. 26, 1994

[54] METHOD FOR DRILLING COOLING HOLES IN TURBINE BLADES

[76] Inventors: Richard H. J. Fierkens, Keurbeek 15, 6914 AE Herwen; Martien H. H. van Dijk; Ger J. N. E. de Vlieger, both of P.O. Box 4341, 5944 ZG Arcen, all of Netherlands

[21] Appl. No.: 31,279
[22] Filed: Mar. 15, 1993
[51] Int. Cl.$^5$ .......................... B23H 3/00; B23H 9/10; 4; 0; B23H 9/14
[52] U.S. Cl. ............................ 204/129.5; 204/129.55
[58] Field of Search ............... 204/224 M, 225, 129.1, 204/129.55

[56] References Cited

U.S. PATENT DOCUMENTS

| | | | |
|---|---|---|---|
| 3,793,169 | 2/1974 | Joslin | 204/129.55 |
| 4,159,407 | 6/1979 | Wilkinson et al. | 204/129.75 X |
| 4,180,373 | 12/1979 | Moore et al. | 416/97 R |
| 4,769,118 | 9/1988 | Johns | 204/225 X |
| 4,995,949 | 2/1991 | Rhoades | 204/129.2 X |
| 5,232,343 | 8/1993 | Butts | 416/97 R |

*Primary Examiner*—Donald R. Valentine
*Attorney, Agent, or Firm*—Antonio Durando; Harry M. Weiss

[57] ABSTRACT

Standard STEM drilling equipment is utilized to effect the electrochemical removal of material in multiple directions in order to produce cooling holes with turbulator ridges. An initial section of the cooling hole is drilled by displacing the electrode vertically into the turbine blade under conditions that produce a hole with an approximate clearance of 0.3 mm around the electrode. The electrode is then moved horizontally about 0.15 mm toward one side of the wall of the hole, thus leaving a clearance of about 0.45 mm on the other side. Vertical drilling of a second hole section is then resumed by the conventional electrochemical process. Because of the position of the electrode relative to the wall of the hole and the correspondingly different current densities in place along the circumference of the wall, a vertical inset is formed below the initial hole section, which creates a turbulator ridge. The process can be repeated in different directions to produce a hole with a common core and a plurality of insets drilled in different directions and having different lengths for each section, as desired. Thus, cooling holes with turbulators disposed in a variety of different configurations can be manufactured with standard equipment.

16 Claims, 2 Drawing Sheets

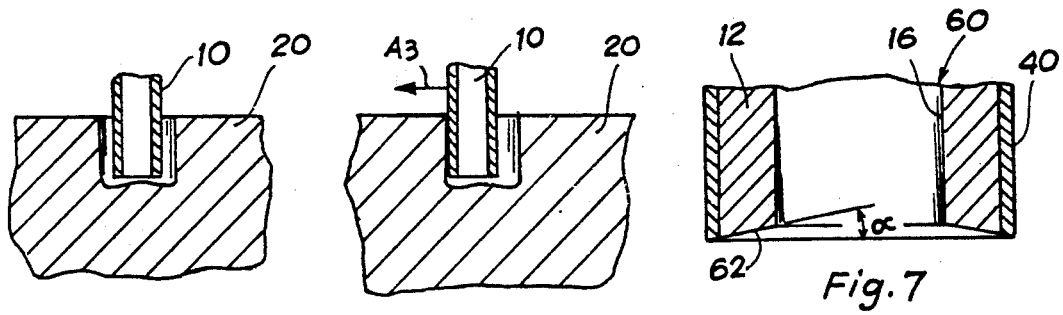
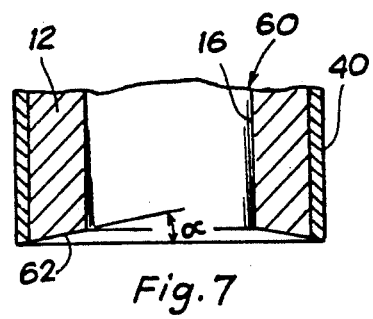
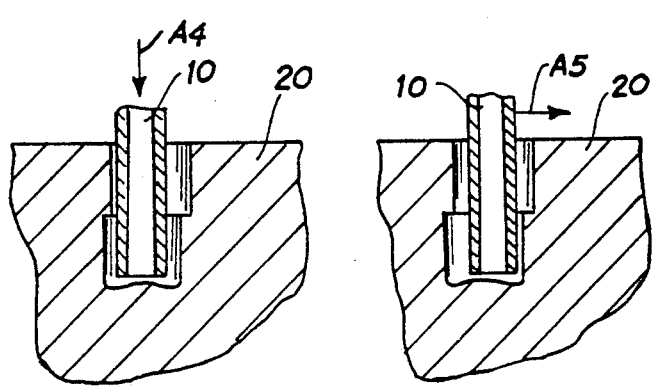
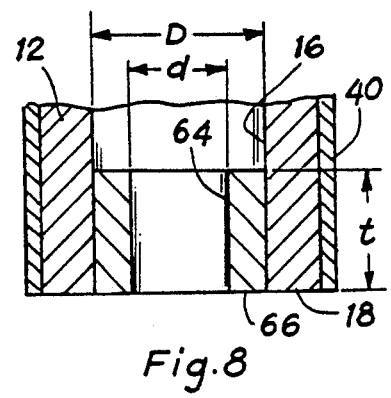
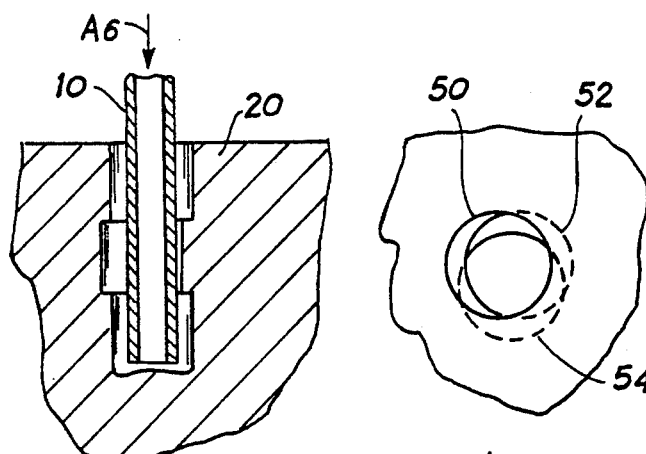
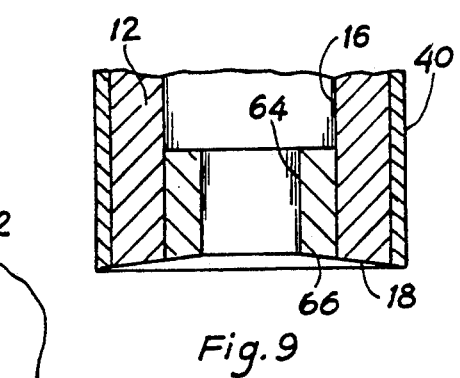
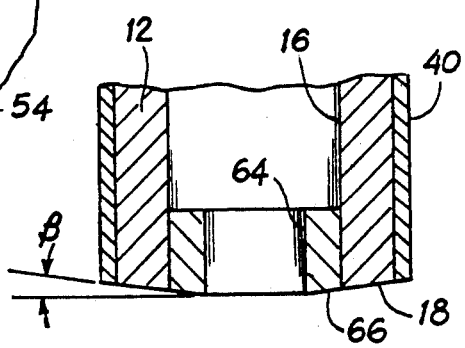

METHOD FOR DRILLING COOLING HOLES IN TURBINE BLADES

BACKGROUND OF THE INVENTION

1. Field of the Invention

This invention is related to the field of manufacture of cooling holes in the blades of high-temperature gas turbines.

2. Description of the Related Art

It is well known from basic principles of thermodynamics that the higher the temperature of combustion gases entering a turbine, the higher the efficiency of the turbine becomes. Therefore, over the years the design of turbines has evolved to include an increase in the gas inlet temperature as one of the changes to improve efficiency and performance. Since higher inlet temperature necessarily results in higher operating temperatures, the strength of the metal turbine blades and their tolerance to high-temperature operation have been a limiting factor to providing further improvements. At steady state operation, the temperature of turbine blades depends on the temperature of the gases flowing through the turbine as well as on heat transfer between the blades and the gases. Therefore, during the last ten years the construction of gas turbine blades has included cooling holes to increase heat transfer from the blade to the surrounding medium. These holes are typically 1.3 to 3 mm in diameter and 20 to 40 cm in length, bored as straight cylindrical apertures (as shown in FIGS. 1a and 1b) across the thickness of the turbine blade by an electrochemical process known in the industry as the Shaped Tube Electrochemical Machining (STEM) drilling process.

In the continuing effort to improve the thermodynamic efficiency of turbines by further increasing the inlet gas temperature, the cooling efficiency of straight holes is no longer sufficient to maintain the temperature of the blades within acceptable limits. Thus, new hole designs have been employed to change the character of the gas flow through the holes in order to increase heat transfer. To that end, the gas turbine industry has recognized for some time the need to produce turbine blades with internal ridges to effect turbulent flow through the holes. These ridges, which are normally called turbulators, thus increase the efficiency of the turbine blade cooling.

An electrochemical method of producing cooling holes with circular ridges (such as shown in FIGS. 2a and 2b) has been developed in the industry, but it involves the use of specially designed electrodes. In addition, if it is desired to maintain the drilling speed available while drilling straight holes, larger power supplies are required than are normally used for drilling holes by the STEM process. These ridges provide an improvement over straight holes, but are not necessarily optimal for all operating conditions. Therefore, it would be advantageous to have a drilling system that permitted the drilling of holes with turbulators placed in a variety of configurations, especially if it could be done with existing equipment. Thus, there exists a need for a method of manufacturing cooling holes with turbulators using standard electrodes or modified electrodes in combination with standard STEM process equipment. This invention is directed as satisfying that need.

BRIEF SUMMARY OF THE INVENTION

It is therefore an object of this invention to provide a method of drilling cooling holes in gas turbine blades with turbulators disposed in different configurations along the surface of the holes.

It is another object of the invention that the method of drilling be compatible with existing equipment, so that cooling holes with turbulators may be produced by the use of standard STEM process electrodes and power generators.

A final objective of this invention is the realization of the above mentioned goals in an economical and commercially viable manner.

These goals are achieved according to this invention by utilizing standard STEM drilling electrodes to effect the electrochemical removal of material in multiple directions. An initial section of the cooling hole is drilled by displacing the electrode vertically into the turbine blade under conditions that produce a hole with an approximate clearance of 0.3 mm around the electrode. The electrode is then moved horizontally about 0.15 mm toward one side of the wall of the hole, thus leaving a clearance of about 0.45 mm on the other side. Vertical drilling of a second hole section is then resumed by the conventional electrochemical process. Because of the position of the electrode relative to the wall of the hole and the correspondingly different current densities in place along the circumference of the wall, a vertical inset is formed below the initial hole section, which creates a turbulator ridge. The process can be repeated in different directions to produce a hole with a common core and a plurality of insets drilled in different directions and having different lengths for each section, as desired. Thus, cooling holes with turbulators disposed in a variety of different configurations can be manufactured with standard equipment.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only some of the various ways in which the invention may be practiced.

BRIEF DESCRIPTION OF THE DRAWINGS

FIG. 1b is a partial cross-sectional view of the straight cooling hole illustrated in FIG. 1a.

FIG. 2b is a partial cross-sectional view of the cooling hole with ridges illustrated in FIG. 2a.

FIG. 3b is a partial cross-sectional view of the cooling hole with ridges illustrated in FIG. 3a.

FIGS. 5a through 5e are a schematic representation of the steps followed using standard STEM drilling process electrodes to manufacture cooling holes with turbulators in the geometry illustrated in FIGS. 3a and 3b.

FIG. 6 is a plan view of a cooling hole with turbulator ridges disposed asymmetrically along the length of the hole.

FIG. 7 is a partial elevational view of a modified cathode having an inwardly-beveled end face to improve the performance of the process of the invention.

FIG. 8 is a partial elevational view of another modified cathode comprising a cylindrical insert to improve the performance of the process of the invention.

FIG. 9 is a partial elevational view of another modified cathode having an inwardly-beveled end face and comprising an inwardly-beveled insert.

FIG. 10 is a partial elevational view of yet another modified cathode having an outwardly-beveled end face and comprising an outwardly-beveled insert.

DETAILED DESCRIPTION OF THE PREFERRED EMBODIMENTS

The STEM drilling process is an electrochemical process whereby an electrical current is established in an acid electrolyte, such as sulphuric or nitric acid, between a cathodic instrument and the workpiece used as an anode, thus causing the anodic dissolution and etching of the workpiece in the proximity of the cathode. The specific rate at which material is dissolved at different points on the surface of the workpiece depends on the corresponding current density. Since the path of electrical current through an electrolyte tends to be linear along the shortest distance between electrodes, the current density is higher at those places where the cathode is closest to the workpiece and quickly becomes negligible as their distance increases. Thus, the process is self-stabilizing.

Figure 4:
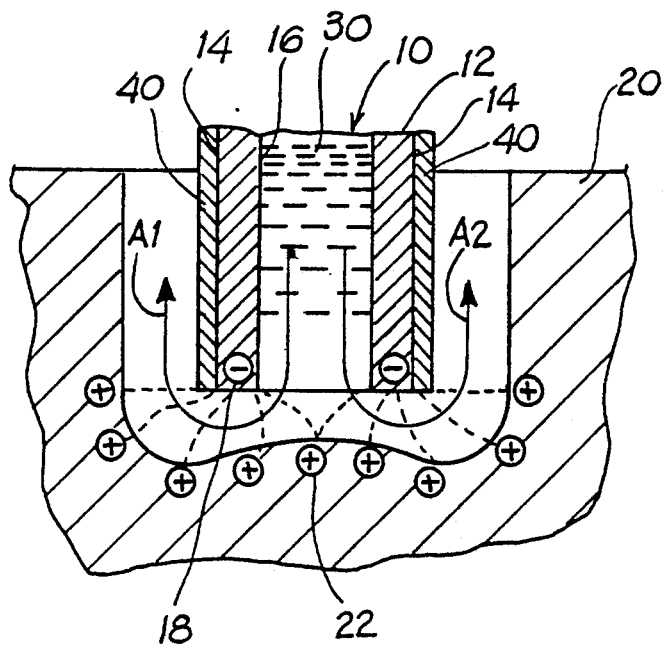
FIG. 4 is a schematic representation of the electrochemical activity during the process of drilling with the STEM process.

Referring to the drawings, like parts are designated throughout with like numerals and symbols. FIG. 4 illustrates in schematic representation the pattern of current flow between a cathode 10 and an anodic workpiece 20 in an acid electrolyte 30. The standard cathode 10 used in the STEM process consists of a titanium tube 12 with a wall typically 0.15 to 0.20 mm thick. The outer surface 40 of the wall is coated with a dielectric layer 14 approximately 0.05 mm thick, while the inside surface 16 and the end face 18 of the wall remain conductive, so that current may flow between them and the workpiece. During the electrochemical process, the acid electrolyte 30 flows inside the tube 12 toward the work face and outside of the tube away from the work face, as indicated by the arrows A1 and A2, while an electrical potential is applied between the electrodes. Because of the pattern of electrolyte flow and the geometry of the conductive surfaces in the cathode, a current is established between the cathodic face 18 and the surface of the workpiece primarily in a vertical direction (toward the surface immediately below the face) and laterally (toward the surface immediately outside of the face), as illustrated schematically by the broken lines connecting the negative face 18 to the cations 22 symbolically marked on the surface of the workpiece. Obviously, current density decreases rapidly as the distance between the face 18 and the workpiece increases as a result of material dissolution, thus requiring the vertical displacement of the cathode to remain close to the workpiece and maintain current flow for continued electrochemical dissolution. Depending on process parameters, the working clearance between the electrode and the workpiece typically varies between 0.1 and 0.3 mm. Parameters such as the nature and concentration of the electrolyte and the operating voltage determine the exact clearance resulting from electrochemical dissolution of the anodic workpiece. Thus, the electrochemical action of the process and the corresponding removal of material from the workpiece is determined by the vertical position of the cathode and the overall operating conditions for the process, permitting the vertical drilling of holes through the workpiece by the vertical displacement of the cathode 10.

Figure 1A:
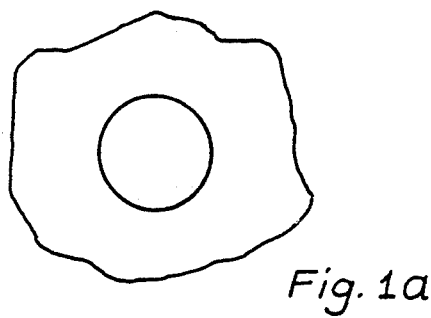
FIG. 1a is a plan view of a straight cooling hole as currently utilized to cool gas turbine blades.
Figure 2A:
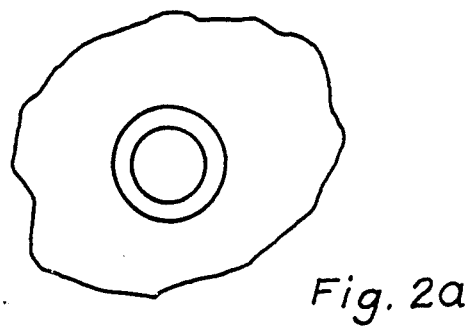
FIG. 2a is a plan view of a cooling hole with turbulator ridges as currently utilized to improve the efficiency in cooling gas turbine blades.
Figure 1B:
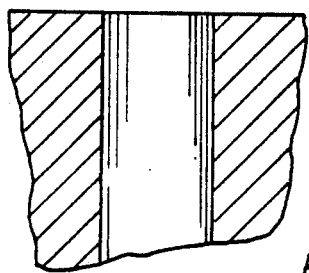
Figure 2B:
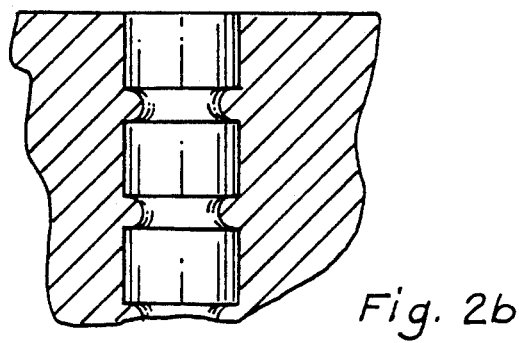
Figure 3A:
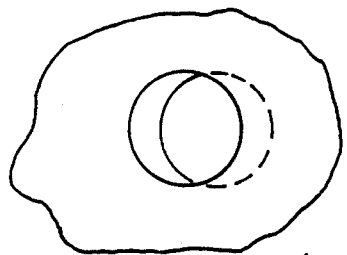
FIG. 3a is a plan view of a cooling hole with symmetrical turbulator ridges manufactured according to this invention to improve the efficiency in cooling gas turbine blades.
Figure 3B:
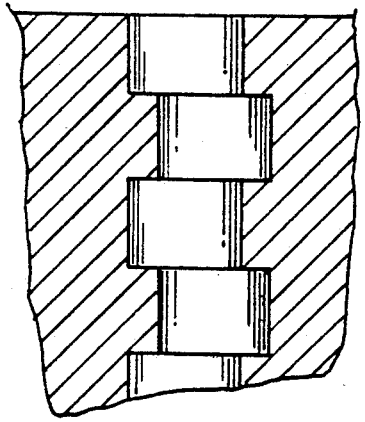

The gist of this invention is the recognition that the electrochemical action lateral to the cathodic tool used in the STEM process can be used advantageously to form turbulator ridges while drilling vertical cooling holes in the blades of gas turbines. This is accomplished by drilling a first vertical section of the cooling hole according to the standard STEM process under operating conditions that produce a clearance of about 0.25 to 3.0 mm between the electrode and the workpiece. The result of this first step is illustrated in cross-sectional view in FIG. 5a. After drilling through the height of the first section, the electrode is displaced laterally about 0.15 to 0.20 mm, so that it is brought to within approximately 0.1 mm from the wall of the hole, as illustrated by the arrow A3 in FIG. 5b. Vertical drilling is then resumed in the direction of arrow A4, creating a second vertical section that is offset from the first one by an amount equal to the lateral displacement of the cathode (see FIG. 5c). When the desired depth of the second vertical section is reached, the electrode is moved back in the direction of arrow A5 either to the original position (FIG. 5d) or to a different offset position and a new vertical section can be similarly drilled in the direction of arrow A6 (FIG. 5e). Thus, by repeating these steps a zig-zag cooling hole with symmetrical sections is drilled with turbulator ridges between each pair of sections, as illustrated in FIGS. 3a and 3b. Because of the freedom with which the electrode can be moved, different turbulator configurations (with varying depths and offsets) can also be accomplished for optimal cooling of a given blade geometry. FIG. 6 illustrates in plan view an example of a cooling hole where the various sections are offset in multiple directions. After drilling a first section 50 and a second section 52 as indicated above, the third section 54 is drilled by moving the electrode not only backwards but also laterally, thus forming asymmetrical sections and turbulator ridges. Obviously, the position of the electrode can be varied at will to effect the geometry of the cooling hole.

The success of this process hinges on the ability of the STEM machine to accurately reproduce positioning parameters for the drilling cathode. The lateral displacement of the electrodes relative to the workpiece may be achieved in several alternative ways. I found that the use of computer numerical control (CNC) adapted to STEM equipment, according to procedures that would be obvious to one skilled in the art, provides the most flexible solution. Such a CNC/STEM unit is capable of positioning accuracies better than 0.02 mm and of timing accuracies within 0.01 seconds for time-dependent commands. These control parameters make it possible to produce holes with internal turbulator ridges varying from 0.50 mm to 9.5 mm and having depth-to-diameter ratios exceeding 100 to 1.

In an effort to further improve the performance of the invention, I found that cathodes with a structure modified according to the geometries shown in FIGS. 7-10 improve the drilling efficiency of the process. In particular, the cathodic face 18 of the standard cathode can be modified to produce a cathode 60 with an inwardly beveled conical end-face surface 62 forming a bevel angle α ranging from 0 to 10 degrees with respect to the plane perpendicular to the main axis of the electrode, as seen in FIG. 7. This modified geometry affects the distribution of current flow between the electrode and the workpiece, permitting a sharper delineation of the side cuts that form the turbulator ridges. The magnitude of the angle α determines the specific drilling characteristics of the cathode and should be selected to optimize the particular operation at hand. Obviously, a larger angle α results in a lower lateral current density and a correspondingly smoother transition surface between turbulator sections. An angle of 7 degrees is typical.

In another modified cathode configuration, shown in FIG. 8, the end face 18 is augmented by the annular end face of a cylindrical insert 64 fitted to the inside surface 16 of the cathode. Obviously, the insert 64 could equivalently be an integral part of the tube 12 of the cathode. Depending on the thickness t and the inside diameter d of the insert, the path of current flow between the cathode and the workpiece is affected not only by the additional cathodic face surface 66 but also by the electrolyte flow-turbulance created by the insert. I found that a modified cathode having an insert 64 with a diameter d at least equal to ½ the inside diameter D of the cathode is optimal for drilling turbulator holes as described in FIGS. 5a-5e.

The geometries of the embodiments of FIGS. 7 and 8 may be combined to produce an electrode with a inwardly beveled end face and comprising an insert that itself may be either cylindrical or beveled. As seen in FIG. 9, the end face 66 of the insert 64 is also beveled and lies in the same conical plane of the end face 18 of the tubular electrode. Similarly, the end face of the electrode and of the insert 64 could be outwardly beveled, as illustrated in FIG. 10. I found that a bevel angle between the end surface and the plane perpendicular to the electrode should also vary between 0 and 10 degrees for effective control of the drilling process.

While the embodiments of the process, cathodes and cooling holes illustrated in the figures feature the specific steps and shapes therein described, the invention can obviously take other steps and shapes with equivalent functionality and utility. Various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent apparatus and methods.

I claim:

1. A process for drilling cooling holes with turbulator ridges in a conventional electrochemical process using a vertical electrode drilling through a metallic workpiece in an acid electrolyte, comprising the following steps:

(a) drilling a vertical section of a cooling hole to a depth in the workpiece;
   (b) displacing the drilling electrode laterally so that it is brought to a position adjacent to a wall of the vertical section just drilled;
   (c) drilling another vertical section to a depth deeper than reached during the immediately-preceding drilling step, thus creating another vertical section that is offset from the vertical section drilled during the immediately-preceding drilling step by an amount equal to the lateral displacement of the drilling electrode during the immediately-preceding lateral-displacement step;
   (d) displacing the drilling electrode laterally in a direction substantially opposite to that of the immediately-preceding lateral-displacement step to a position adjacent to a wall of the vertical section drilled during the immediately-preceding drilling step;
   (e) repeating steps (c) and (d) through the metallic workpiece to form a cooling hole with multiple offset sections with turbulator ridges therebetween.

2. The process described in claim 1, wherein all vertical sections are drilled to the same depth.

3. The process described in claim 1, wherein
   said step (a) is conducted under operating conditions that produce a clearance of 0.25 to 3.0 mm between the electrode and the workpiece;
   said step (b) is conducted by displacing the drilling electrode laterally 0.15 to 0.20 mm, so that it is brought to within approximately 0.1 mm from the wall of the workpiece; and
   said step (d) is conducting by displacing the electrode laterally in the direction opposite to that of step (b) to a position approximately 0.1 mm from the wall of the vertical section just drilled in the direction opposite to that of the displacement in step (b).

4. A turbine-blade cooling hole with turbulator ridges manufactured according to the process described in claim 3.

5. The process described in claim 1, wherein said steps (a) through (e) are carried out with an electrode having an inwardly beveled conical end-face surface forming a bevel angle ranging from 0 to 10 degrees with respect to the plane perpendicular to the main axis of the electrode.

6. The process described in claim 5, wherein said steps (a) through (e) are carried out with an electrode having a bevel angle of 7 degrees.

7. A turbine-blade cooling hole with turbulator ridges manufactured according to the process described in claim 5.

8. The process described in claim 1, wherein said steps (a) through (e) are carried out with a tubular electrode having an end face augmented by the annular end surface of a cylindrical insert.

9. A turbine-blade cooling hole with turbulator ridges manufactured according to the process described in claim 8.

10. The process described in claim 1, wherein said steps (a) through (e) are carried out with a tubular electrode having an inwardly beveled conical end-face surface and comprising a cylindrical insert having an inwardly beveled conical end-face surface, said bevel surfaces lying on a single conical surface forming an angle ranging from 0 to 10 degrees with respect to the plane perpendicular to the main axis of the electrode.

11. The process described in claim 10, wherein said steps (a) through (e) are carried out with an electrode having a bevel angle of 7 degrees.

12. The process described in claim 1, wherein said steps (a) through (e) are carried out with a tubular electrode having an outwardly beveled conical end-face surface and comprising a cylindrical insert having an outwardly beveled conical end-face surface, said bevel surfaces lying on a single conical surface forming an angle ranging from 0 to 10 degrees with respect to the plane perpendicular to the main axis of the electrode.

13. The process described in claim 12, wherein said steps (a) through (e) are carried out with an electrode having a bevel angle of 7 degrees.

14. A turbine-blade cooling hole with turbulator ridges manufactured according to the process described in claim 1.

15. A method for drilling cooling holes with turbulator ridges in a conventional electrochemical process using an electrode drilling through a metallic workpiece in an acid electrolyte, comprising the following steps:
  (a) utilizing the electrode to drill a section of a cooling hole to a depth in the workpiece;
  (b) displacing the drilling electrode laterally so that it is brought to a position adjacent to a wall of the section just drilled;
  (c) repeating steps (a) and (b) through the metallic workpiece to form a cooling hole with multiple offset sections with turbulator ridges therebetween.

16. A turbine-blade cooling hole with turbulator ridges manufactured according to the process described in claim 15.

* * * * *